United States Patent [19]

Mann

[11] Patent Number: 5,015,822
[45] Date of Patent: May 14, 1991

[54] NOZZLE STRUCTURE IN WELDING GUN

[75] Inventor: Robert N. Mann, Mississauga, Canada

[73] Assignee: MIG VAC Inc., Mississauga, Canada

[21] Appl. No.: 434,275

[22] Filed: Nov. 13, 1989

[51] Int. Cl.⁵ .............................................. B23K 9/00
[52] U.S. Cl. ............................................... 219/137.41
[58] Field of Search ........................... 219/137.41, 136

[56] References Cited

U.S. PATENT DOCUMENTS 3,909,586 9/1975 Landis et al. .................... 219/137.41

FOREIGN PATENT DOCUMENTS 3135381 3/1983 Fed. Rep. of Germany ........................ 219/137.41

Primary Examiner—Clifford C. Shaw
Attorney, Agent, or Firm—Sim & McBurney

[57] ABSTRACT

A nozzle structure for a fume-extracting welding gun is described which provides for efficient removal of fume from a welding site. The nozzle is provided with laterally elongate slots formed through a tapering portion or a right cylindrical portion of the nozzle.

4 Claims, 3 Drawing Sheets

1

NOZZLE STRUCTURE IN WELDING GUN

FIELD OF INVENTION

The present invention relates to welding guns and more particularly to a nozzle structure in fume and smoke extracting welding guns.

BACKGROUND TO THE INVENTION

Arc welding operations are known to produce undesirable fumes and smoke during the welding process, many of which are particularly noxious to the welder or others in the vicinity of the welding operation. Such fumes and smoke when allowed to accumulate in confined spaces have long been known to constitute a safety hazard, as well as an interference to welder visibility and general welding operation efficiency.

Fume extraction devices commonly have been employed to remove the fumes and smoke from the welding area to overcome the above-noted difficulties. Such devices comprise a dual conduit, with one conduit containing the conventional components of the welding apparatus and the other conduit providing a passageway for extraction of the undesirable fumes. The conduits may be formed concentrically.

Representative prior art patents describing such fume-extracting welding process includes:
U.S. Pat. Nos.
3,909,586, 4,016,398, 2,768,278, 4,057,705, 3,305,664, 4,095,080, 3,514,567, 4,276,464, 3,707,616, 4,284,873, 3,775,587, 4,340,804, 3,878,354, 4,382,170, 3,886,344, 3,980,860.
Canada
954,786,
West German Patent No.
3,135,381
U.S. Pat. Nos.
1,981,570, 4,388,514, 3,186,132, 4,493,970, 3,524,038, 4,502,179, 4,168,562, 4,527,037, 4,183,116, 4,565,914, 4,287,405, 4,797,528, 4,330,109,
West German Patent Nos. 2,948,475 and 3,421,202. Of this prior art, it is believed that the structure shown in U.S. Pat. No. 3,909,586 and West German Patent no. 3,135,381 are the closest known art to the present invention. Both of these patents describe fume extracting welding guns in commercial use. The former patent does not use shielding gas while latter does.

SUMMARY OF INVENTION

The present invention provides a novel nozzle structure for a fume extracting welding gun that produces a more-efficient extraction of fume from the welding area than is achieved by the commercial embodiments of the above-noted prior art patents.

In the nozzle arrangement of the present invention, a series of openings, generally in the form of transverse elongate slots, is provided to remove the fume and is located either in a surface of the nozzle tapering towards the downstream end of the gun or in a right cylindrical surface of the nozzle. One edge of each of the openings is coincident with the location of commencement of the taper and the edges of the opening are sharp.

One specific structure that has been found to be effective is a sleeve in the form of an elongate tube of length 3-⅝ inch and thickness 0.070 inch, having a portion tapering at an angle of 20° to the axis of the tube for 0.5 inch from an outside diameter of 1.375 inch to 1.005 inch. Four slots are provided in the tapering portion each extending for 0.190 inch in the longitudinal direction and for 0.5764 inch in the transverse direction, with the upstream edge of slot being coincident with the commencement of the taper.

DESCRIPTION OF PREFERRED EMBODIMENT

Figure 1:
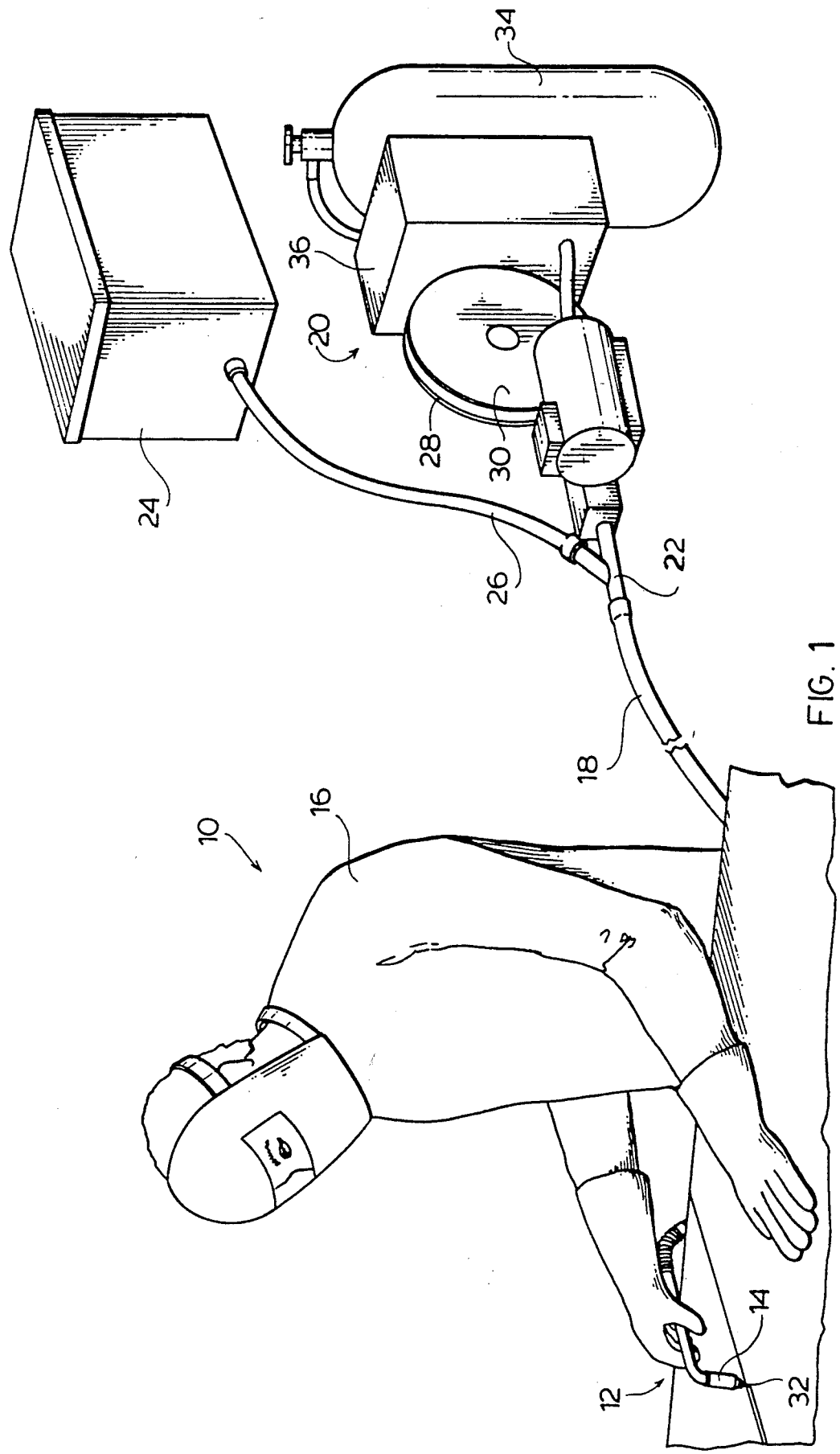
FIG. 1 is a schematic representation of a fume-extracting welding apparatus incorporating a fume-extracting nozzle according to one embodiment of the invention.

Referring to the drawings, FIG. 1 illustrates schematically a fume-extracting welding gun 10 including a head portion 12, a control handle portion gripped by a welder 16 during operation, a flexible connector hose portion 18 and a services supply portion 20. The connector hose 18 preferably is constructed as described in my U.S. Pat. No. 4,496,823, the disclosure of which is incorporated herein by reference.

The flexible connector hose 8 terminates in a TY adaptor 22 which communicates with a vacuum pump 24 by a hose 26. The vacuum pump 24 applies a vacuum to the interior of the hose 18 to remove fumes and smoke from adjacent the weld site at the head 14 of the unit 10.

The service supply portion 20 comprises a consumable welding wire feeding mechanism 28 which includes a reel 30 of welding wire 32, an electrical connector connected to a power cable which surrounds the welding wire 32, an inert gas feed hose connected through an electrically-operated solenoid valve to a source of inert gas 34 for providing shield gas at the welding tip. The inert gas feed hose also carries electrical connector wires which pass to an electrical power source 36, which also serves to activate the solenoid valve. Further detail of the services supply portion 20 can be found in my U.S. Pat. No. 4,496,823, referred to above.

Figure 2:
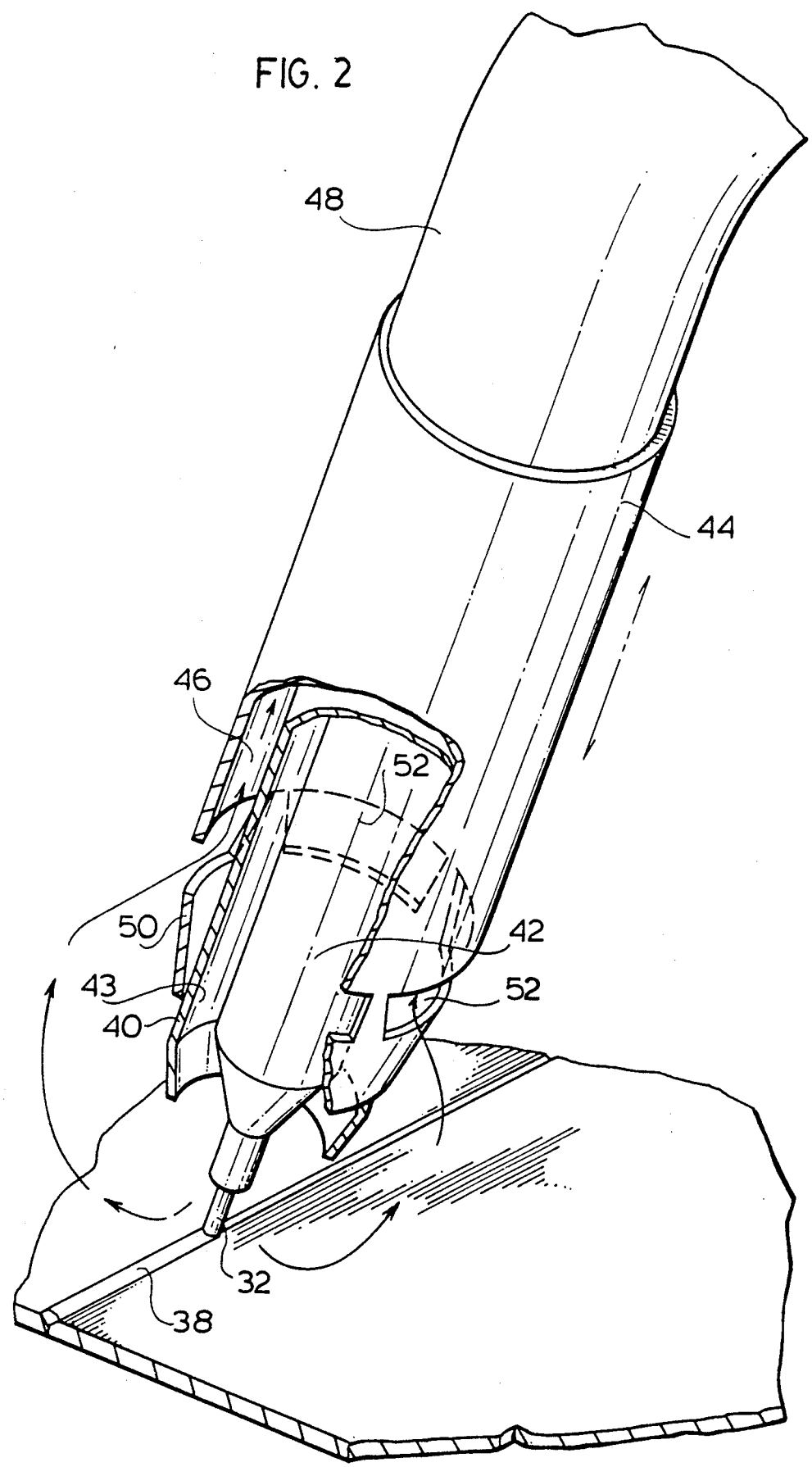
FIG. 2 is a perspective, part-sectional view of a fume-extracting nozzle in accordance with one embodiment of the invention in operative position.
Figure 3:
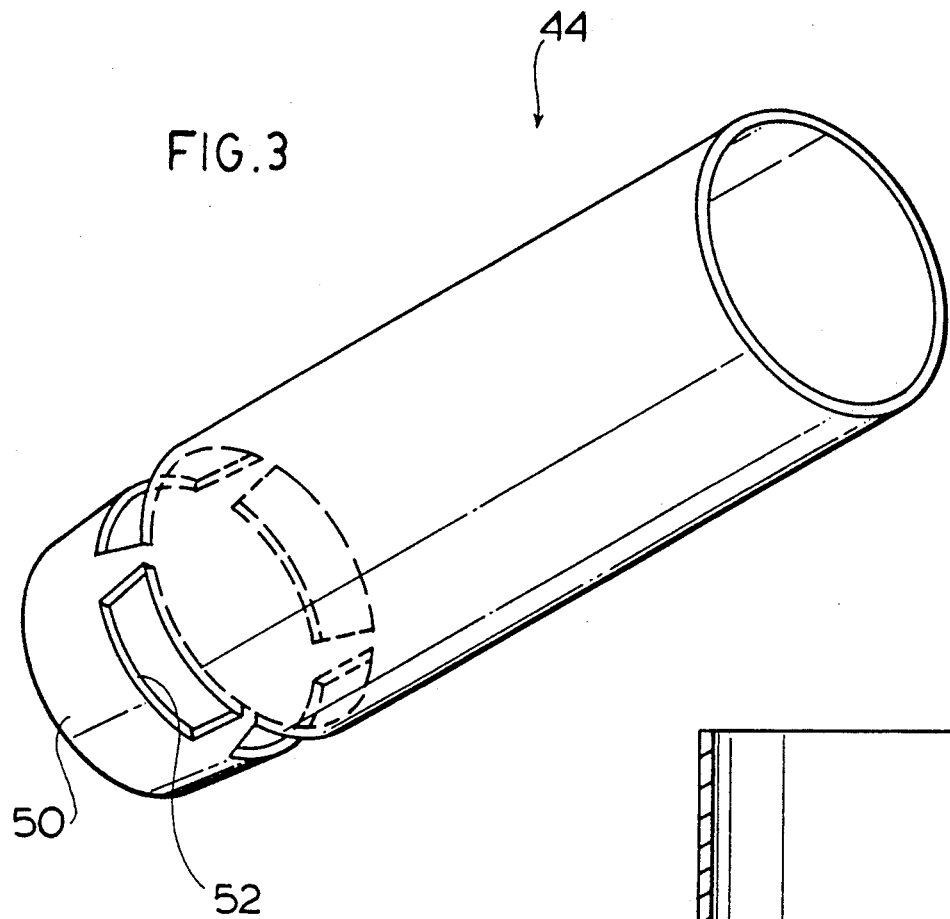
FIG. 3 is a perspective view of the nozzle of FIG. 2.
Figure 4:
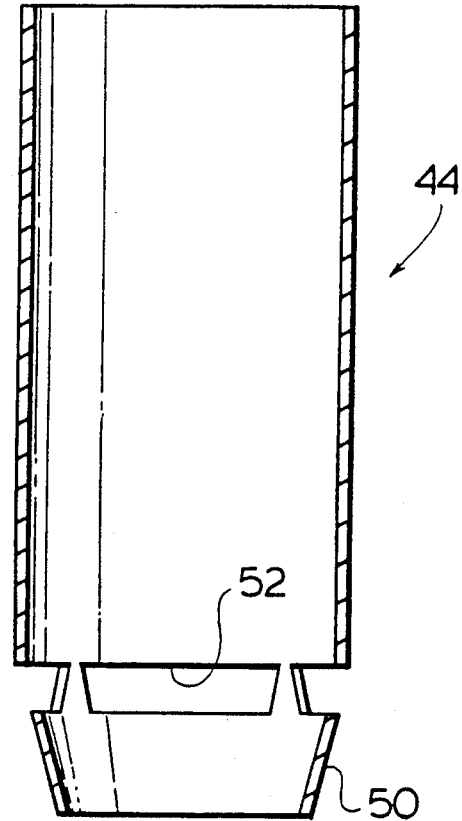
FIG. 4 is a sectional view of the nozzle of FIG. 3.

Referring to FIG. 2, there is illustrated therein a close-up of the downstream end of a welding gun head constructed in accordance with one embodiment of the invention. Welding wire 32 projects from the end of the gun and provides a weld 38 at the welding site in conventional manner. A nozzle insulator 40 surrounds the contact tip 42 for the welding wire 32 and defines a passageway 43 through which inert gas, such as carbon dioxide or argon, passes to provide a sheath of inert gas surrounding the welding wire 32 at the welding site.

An outer sleeve 44 surrounds the inert gas feed pipe 40 to define a fume-extracting passageway 46 connected to the source of vacuum 24 in conventional manner. The sleeve 44 is mounted to an elbow portion 48 of the welding gun 12 in axially sliding relation with respect thereto, to permit the sleeve to be moved closer to or further away from the welding site, to alter the influence of the vacuum applied through the passageway 46 on the welding site.

The sleeve 44 has a tapering portion 50 which engages the nozzle insulator 40 at its lower extremity. The sleeve 44 is provided with a plurality of slots 52 which are formed in the tapering portion 50. The slots 52 are narrow in the axial direction of the sleeve 44 and are elongate in the transverse direction. Four such slots 52 are shown in the illustrated embodiment. Other numbers are possible.

Although the illustrated structure employs a tapering portion 50, it is also possible for the lower extremity of the sleeve 44 to be provided by flat surface. The slots 52 are found with sharp edges a side one of which is coincident with the commencement of the taper.

Although the slots 52 are shown in the tapering portion 50, they may also be provided in the right-cylindrical portion of the sleeve 44, provided that one edge is coincident with the location of join. The slots 52 may be replaced by other shaped openings.

In use, the inert gas stream leaving the passageway 43 forms a shroud of inert gas surrounding the welding site and prevents it from oxidation by ambient air. This activity forms a mass of inert gas contaminated by welding by products, which is drawn, along with ambient air into the slots 52 by the vacuum applied through the passageway 46.

It has been found through experimentation that the provision of the slots 52 in the conical taper 50 or in the right-cylindrical portion of the sleeve 44, with one edge coincident with the location of join, provides an efficient removal of the contaminated inert gas from the welding site. The reason for the efficient removal of the fume by the arrangement employed in the present invention is thought to arise from the angular orientation of the slot opening with respect to the fume providing a more favorable relationship to the fume for entry of fume into the passageway 46.

In addition, it has been found through experimentation that the provision of the slots 52 which are narrow in the axial direction produces a much more efficient removal of the fume from the welding site than slot or openings which are wide in the axial direction, such as disclosed in German Patent no. 3,135,381. The reason for the more efficient removal of fume by the arrangement employed in the present invention is thought to arise from the narrow axial length combined with the angular orientation of the slot opening providing a more favorable relationship to the fume for entry into the passageway 46.

SUMMARY OF DISCLOSURE

In summary of this disclosure, the present invention provides a novel fume-extracting gun having an improved efficiency of removal of fume by the employment of a nozzle of specific design and orientation of slot. Modifications are possible within the scope of this invention.

What I claim is:

1. A welding gun head, comprising:
   a welding wire conduit extending generally centrally within said welding gun head to define a fume-extracting passageway within said gun head; and
   a sleeve surrounding said conduit adjacent the downstream end thereof and having a tubular portion mounted relative to a fixed tubular portion of said head, in overlapping relationship for selected axial movement of the said sleeve relative to the tubular portion of said head,
   said sleeve having downstream portion thereof tapering to engagement with said conduit, and
   a plurality of transversely-elongate narrow slots formed in said sleeve with an edge coincident with the location of commencement of said taper defining inlet openings to said fume-extracting passageway, each of said slots having a trapezoid outline with parallel longitudinal edges significantly greater in dimension that the lateral edges.

2. The welding gun of claim 1 wherein said slots are formed in said taper.

3. The welding gun of claim 1 wherein said slots are formed in a right-cylindrical portion of said sleeve.

4. The welding gun of claim 1 wherein said gun head also comprises an inert gas-conveying conduit to convey inert-shielding gas to a welding site.

* * * * *